April 21, 1931.  J. REIF  1,802,067
AUTOMOBILE JACK
Filed April 10, 1926  6 Sheets-Sheet 1
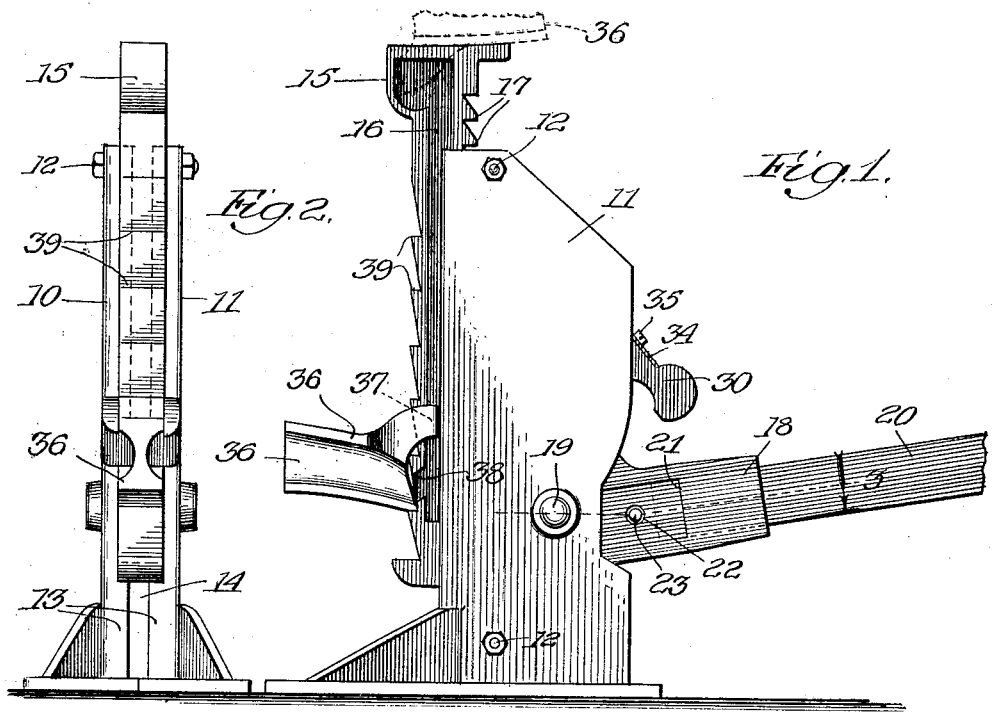
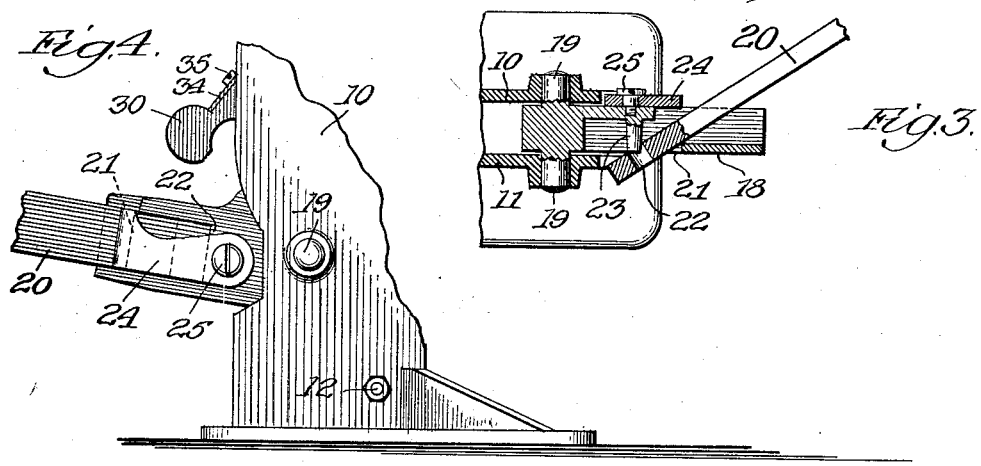
Inventor:
Joseph Reif,
By Dyrenforth, Lee, Chritton & Wiles,
Attys.

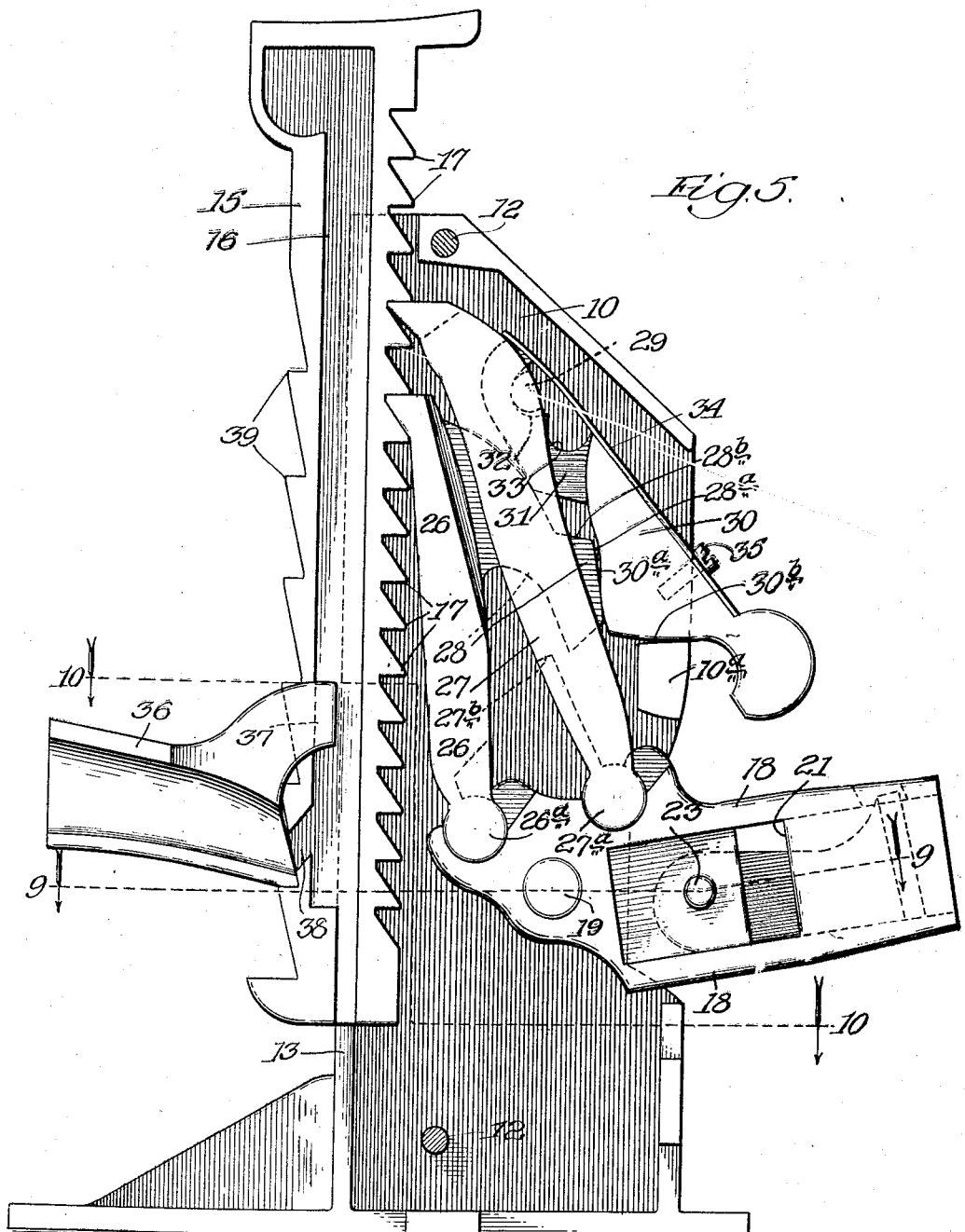

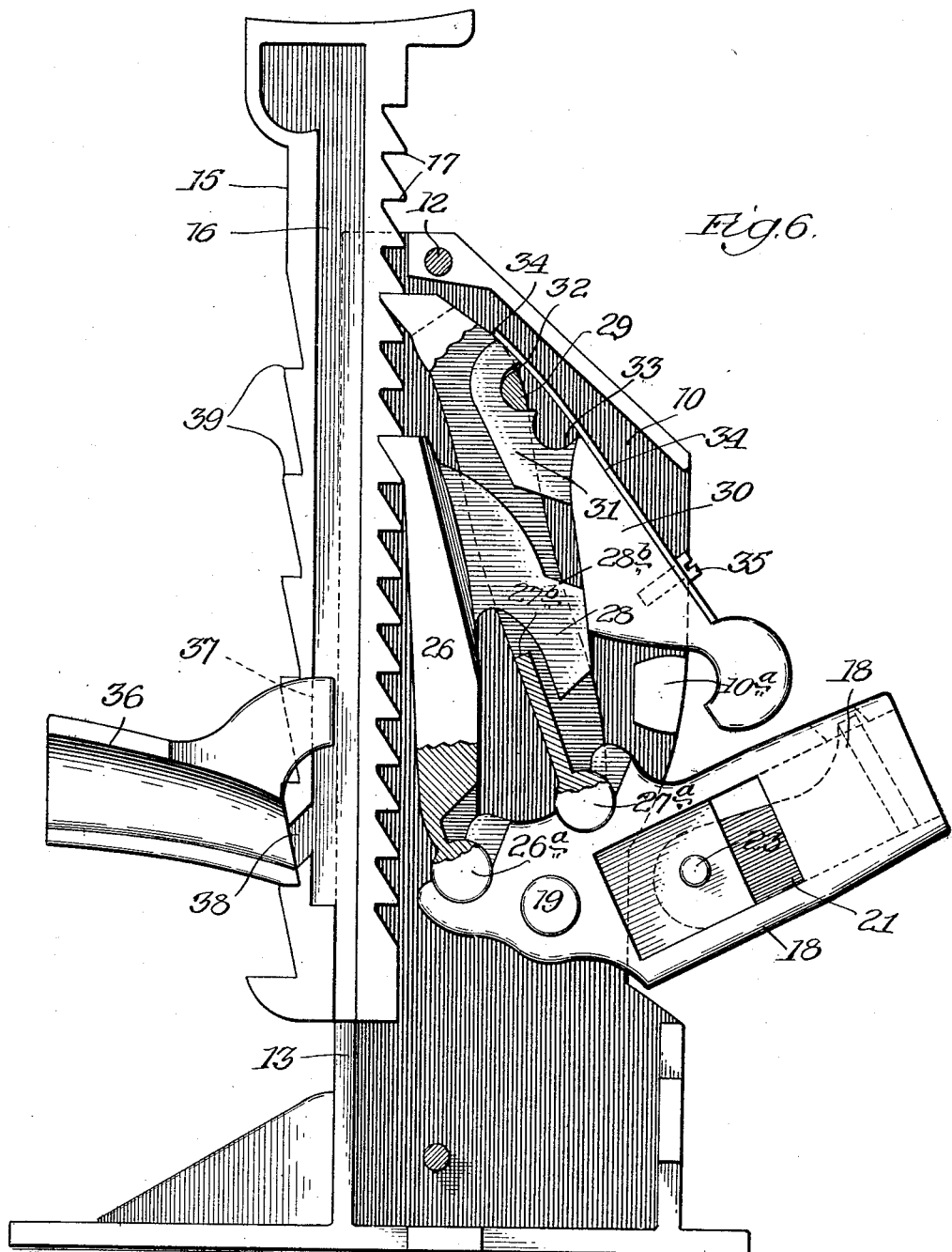

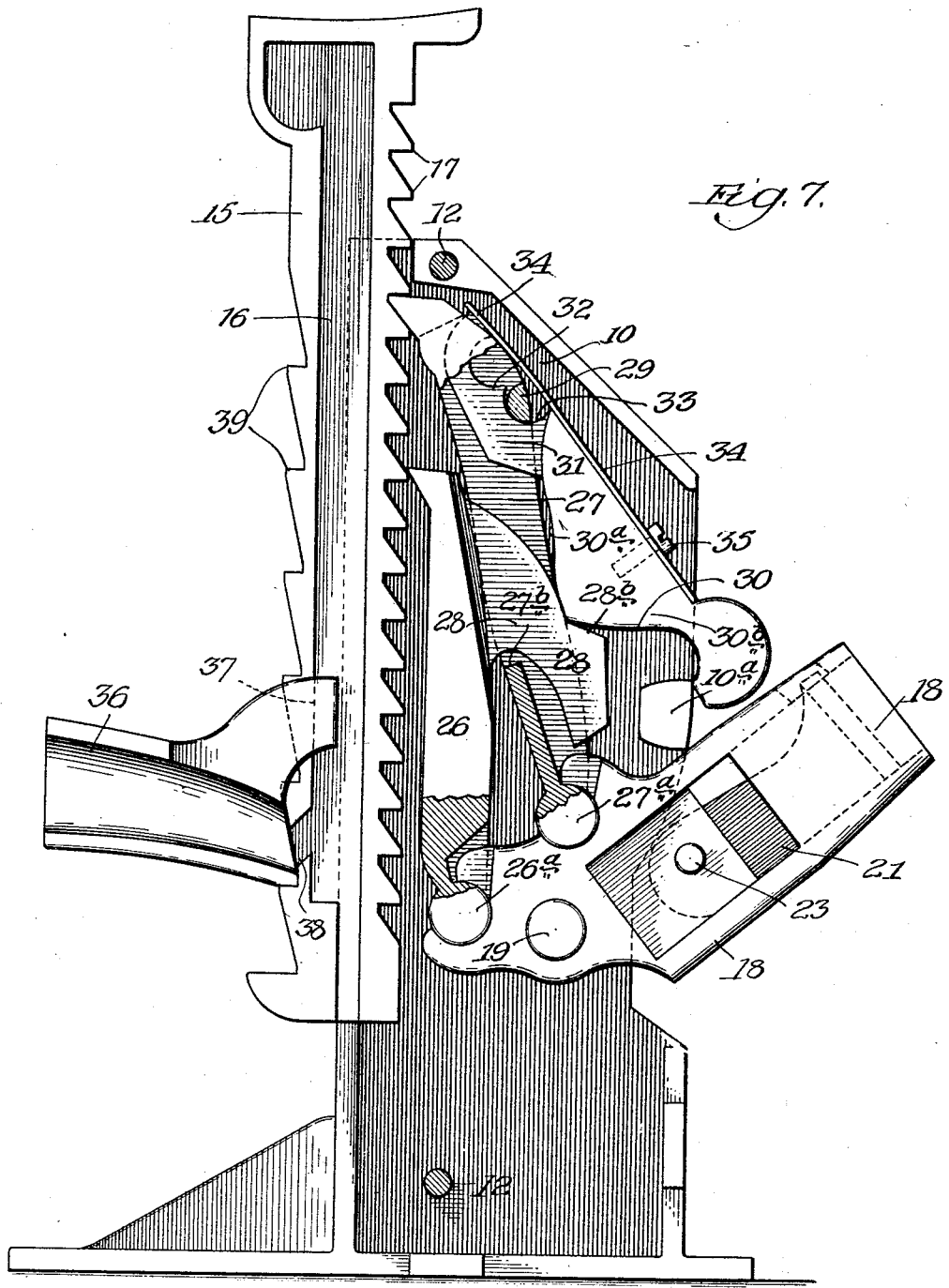

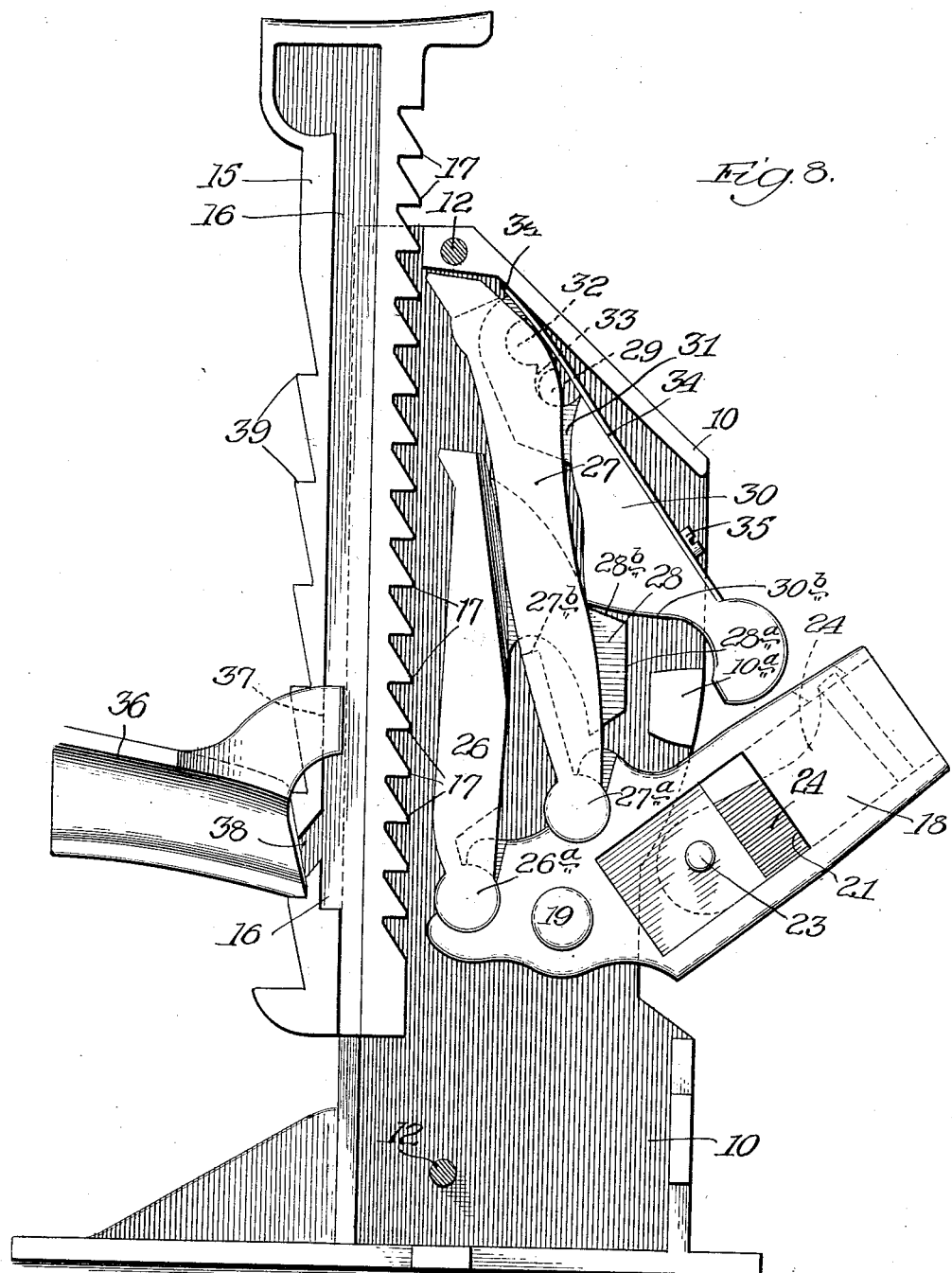

April 21, 1931.  J. REIF  1,802,067
AUTOMOBILE JACK
Filed April 10, 1926  6 Sheets-Sheet 6

Inventor,
Joseph Reif,
By Dyrenforth, Lee, Chritton & Wiles
Attys.

Patented Apr. 21, 1931

1,802,067

UNITED STATES PATENT OFFICE

JOSEPH REIF, OF HEBRON, INDIANA, ASSIGNOR OF ONE-HALF TO FRANCIS E. LING

AUTOMOBILE JACK

Application filed April 10, 1926. Serial No. 101,108.

This invention relates to automobile jacks and is fully described in the following specification and shown in the accompanying drawings, in which:

Figure 1 is a side elevation of the jack;

Fig. 2 is a rear elevation of the same;

Fig. 3 is a partial section on the line 3 of Fig. 1;

Fig. 4 is a partial side elevation of the jack as viewed on the opposite side of Fig. 1;

Fig. 5 is a side elevation of the jack with one side of the housing removed showing the parts in the raising position showing the operating lever lowered;

Fig. 6 is the same showing the operating lever raised;

Fig. 7 is a similar view showing the parts in position for lowering, the operating lever being raised;

Figure 9:
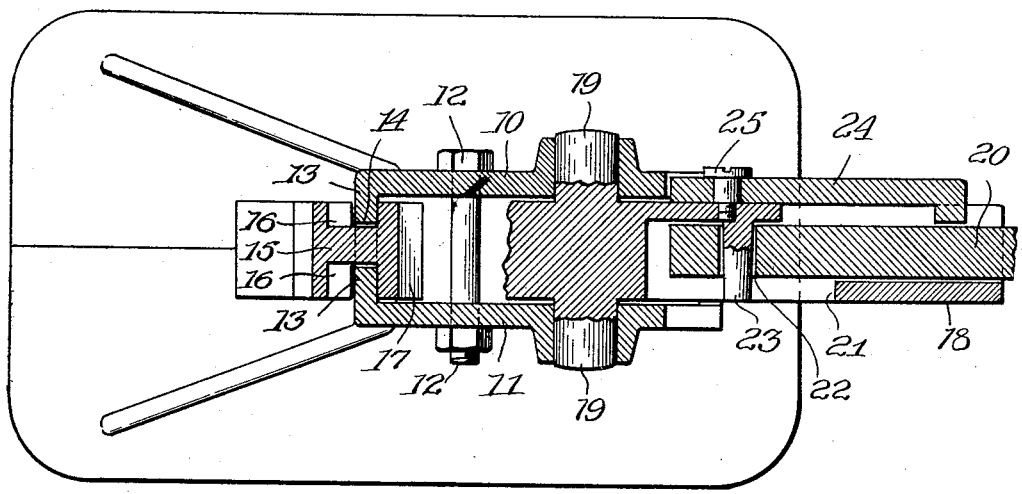
Figure 10:
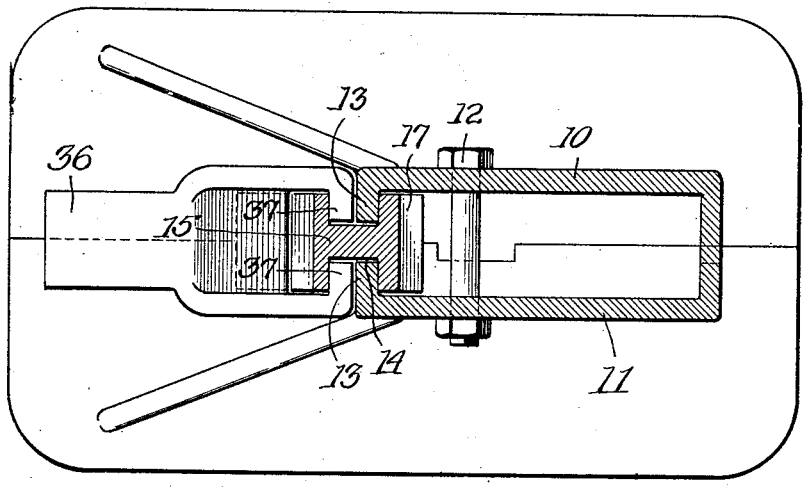

Fig. 8 is a similar view showing the pawls drawn back thereby permitting the lifting bar to drop when no load is on the jack; and Figs. 9 and 10 are horizontal sections on the lines 9—9 and 10—10 of Fig. 5.

The jack comprises a housing consisting of two facing members 10 and 11 which are secured together by means of bolts or rivets 12 and which have parallel facing flanges 13 along the rear edges which are separated as shown in Fig. 2 to form a vertically disposed slot 14.

A lifting member 15 of a generally H cross section is adapted to slide therein, the web 16 sliding in the slot 14. Rack teeth 17 are formed on the inner face of the lifting member 15 and are adapted to be engaged by the ends of the lifting pawls as will later be explained.

A lever socket member 18 has a laterally extending pin 19 which extends through openings in the side members 10 and 11 as is shown in Fig. 3. An operating lever 20 is adapted to pass through an opening 21 in the side of the socket 18 and has an opening 22 adapted to engage a pin 23 on the socket 18. This is accomplished as shown in Fig. 3 by inserting the end of the lever 20 through the opening 21 and then rocking it in a clockwise direction until the lever 20 strikes the bottom of the socket 18. This is then retained by means of the keeper 24 which is hingedly secured to the socket 18 by means of a screw or rivet 25, the keeper 24 having been moved to one side during the time the lever 20 is being inserted.

Inner and outer pawls 26 and 27 respectively have rounded ends 26$^a$ and 27$^a$ which fit into cylindrical sockets in the lifting member 18. The pawl 26 has an ear 28 which extends through a slot in the pawl 27, this slot being preferably centrally located. A shoulder 27$^b$ engages the outer end of the ear 28 to prevent the outer pawl becoming disengaged from the ear 28 upon the lowering operation of the jack, as will later be explained.

A bar 29 extends across the upper portion of the slot in the outer pawl 27. A reversing member 30 has a finger 31 in which are two notches 32 and 33, either of which is adapted to engage the bar 29 when the finger 31 is placed adjacent the ear 28 in the slot of the outer pawl 27. A lever spring 34 secured to the reversing member by means of a screw 35 bears upon the outer face of the pawl 27 and serves to hold the finger 31 in contact with the bar 29.

As shown in Fig. 5, the mechanism is at the position for raising, both the pawls 26 and 27 bearing upon rack teeth as would normally be the case when a load is supported by the jack, no force being applied at the time to the lever 20.

To throw the lifting mechanism into reverse or lowering position, it is necessary only to force the reversing member 30 upward until the notch 33 is under the bar 29. This can be most readily done, when the jack is under the car, by raising the lever socket member 18 until it strikes the lower end of the member 30. A continued pressure will then force the reversing member 30 forward to the lowering position as shown in Fig. 7.

The raising operation is as follows: beginning with the normal position of the jack as shown in Fig. 5, the operator raises the lever 20 thereby raising the socket member 18 which will cause the outer pawl 27 to lift while the inner pawl 26 will be lowered until it drops behind the next tooth of the rack as shown in Fig. 6. During this part of the lifting operation the shoulder 30ª bears upon the face 28ª of the ear 28 and forces the pawl 26 into the teeth of the rack, the spring 34 serving also to force the pawl 27 toward the rack. During this time the shoulder 30ᵇ of the reversing member 30 bears upon the lug 10ª on the housing 10.

With the parts in the position shown in Fig. 6, the socket member 18 is then lowered from the position shown in Fig. 6 to that shown in Fig. 5, during which time the inner pawl 26 does the lifting, raising the rack until the outer pawl 27 will drop into the next tooth below that in which it is placed in Fig. 6. Thus it will be seen that first an upward and then a downward movement is required to raise the rack member one notch. To assist keeping the two pawls 26 and 27 in engagement with the rack, they are set at an angle thereto, so that once the pawl is in engagement with a tooth of the rack, the weight on the rack bar is sufficient to insure its hold thereon.

The lowering operation is as follows: with the parts in the position shown in Fig. 5, the operator lifts the member 18 thereby forcing the reversing member 30 upward until the notch 33 lies under the bar 29, as has been previously explained. This places the parts in the position shown in Fig. 7. Raising the operating lever slightly so as to throw all of the weight upon the outer pawl 27, the shoulder 28ᵇ is lowered until it passes under the shoulder 30ᵇ of the reversing member, the pressure of the spring 34 then acting on the inclined surface 28ᵇ to force the inner pawl 26 toward the outer pawl 27 and to hold it there until the upper edge of the pawl 26 has passed the edge of the tooth of the rack upon which it rested in Fig. 5. As the lever continues to descend the shoulder 30ᵇ passes over the shoulder 28ᵇ until it engages the face 28ª when the spring 34 then forces the pawl 26 toward the rack. Continuing the lowering of the operating lever returns the parts to the position shown in Fig. 5. The operator slightly lowers the operating lever thereby slightly raising the rack member and disengaging the outer pawl 27, the spring 34 serving to force it away from the rack. Raising the operating lever then permits the pawl 27 to move up and catch the next tooth of the rack.

It will be understood that as long as there is weight upon the rack, it will tend to keep the pawls in engagement with the rack against the action of the spring 34 aided by the friction of the parts when the operating lever is lowered. When the inner pawl 26 is in contact the weight supported by the rack forces it into the rack teeth and on raising the lever to permit the outer pawl to reach up and catch the next rack tooth, the shoulder 27ᵇ slides down the inside of the ear 28 and forces the outer pawl into the next rack tooth.

On removal of the weight however, both pawls will be withdrawn from the rack on the next downward movement of the operating lever as has previously been explained, thereby causing the rack to drop.

The foot 36 has fingers 37 which engage the groove in the rack member and may be removed through the openings 38. This foot may be carried up and rest on top of the rack member so as to increase its height. Notches 39 are formed on the back of the rack to hold the foot at several levels.

While I have shown and described but a single embodiment of this invention it is to be understood that it is capable of many modifications. Changes therefore in the construction and arrangement may be made which do not depart from the spirit and scope of the invention as disclosed in the appended claims.

I claim:

1. In a lifting jack, a housing, a lifting member slidable therein having rack teeth on one side, an oscillating lever member pivotally mounted in said housing, lifting and retaining pawls operable on said rack and cooperating with said lever member for raising and lowering said lifting member, and a reversing mechanism having a member operable by swinging movement of said lever member outside the path of its swing while raising for reversing said mechanism.

2. In a lifting jack, a housing, a lifting member slidable therein having rack teeth, and an oscillating lever member pivotally mounted in said housing, lifting and retaining pawls cooperating with said lever member for raising and lowering said lifting member, and a reversing mechanism having a member operable by swinging engagement with said lever member outside the normal path of its swing while raising for shifting said reversing mechanism from raising to lowering position.

3. In a lifting jack, a housing, a lifting member slidable therein having rack teeth on one side, an oscillating lever member pivotally mounted in said housing, lifting and retaining pawls operable on said rack member and cooperating with said lever member for raising and lowering said lifting member, and a reversing mechanism having a member operable by upward movement of said lever member outside the path of its swing while raising for reversing said mechanism.

4. In a lifting jack, a housing, a toothed lifting member slidable therein, an oscillating lever member pivotally mounted in said housing, pawls pivotally connected to said oscillating member and operable on said toothed lifting member, the inner pawl having an ear extending through an opening in the outer pawl, a reversing member hingedly connected to the outer pawl, and a spring pressing said reversing member toward said bar.

5. In a lifting jack, a housing, a toothed lifting member slidable therein, an oscillating lever member pivotally mounted in said housing, an inner and an outer pawl pivotally connected to said oscillating member on opposite sides of its fulcrum and operable on said toothed lifting member, the inner pawl having an ear extending through an opening in the outer pawl, a reversing member hingedly connected to the outer pawl, and a spring pressing said reversing member toward said bar.

6. In a lifting jack, a housing, a toothed lifting member slidable therein, an oscillating lever member pivotally mounted in said housing, an inner and an outer pawl pivotally connected to said oscillating member on opposite sides of its fulcrum and operable on said toothed lifting member, the inner pawl having an ear extending through an opening in the outer pawl, a reversing member and a spring pressing said reversing member toward said bar, said spring being of flat metal carried by said reversing member and bearing on the outer member beyond the pivot point of said reversing member.

7. In a lifting jack, a housing, a toothed lifting member slidable therein, an oscillating lever member pivotally mounted in said housing, an inner and an outer pawl pivotally connected to said oscillating member on opposite sides of its fulcrum and operable on said toothed lifting member, the inner pawl having an ear extending through an opening in the outer pawl, a reversing member a spring pressing said reversing member toward said bar, said spring being of flat metal carried by said reversing member and bearing on the outer member beyond the pivot point of said reversing member, and a stop on the housing serving to lift said reversing member away from the outer pawl and the ear on the inner pawl on the downward movement of said outer pawl when said reversing member is in lifting position.

8. In a lifting jack, a housing, a lifting member slidable therein having rack teeth on one side, an oscillating lever member pivotally mounted in said housing, lifting and retaining pawls operable on said rack member and cooperating with said lever member for raising and lowering said lifting member, and a reversing mechanism having a member lying outside the normal swing of said lever for raising movement but which is adapted to be moved by said lever when the latter is moved outside its normal swing to cause said member to reverse the reversing mechanism.

9. In a lifting jack, a housing, a lifting member slidable therein having rack teeth on one side, an oscillating lever member pivotally mounted in said housing, lifting and retaining pawls operable on said rack member and cooperating with said lever member for raising and lowering said lifting member, and a reversing mechanism having a member lying outside the normal swing of said lever for raising and lowering movement but which is adapted to be moved by said lever when the latter is moved outside its normal swing during a lifting operation to cause said member to move the lifting mechanism to lowering position whereby the jack may be reversed following a lifting operation by a movement of the jack handle alone.

In testimony whereof I have hereunto set my hand and seal this 14 day of November, 1925.

JOSEPH REIF.